United States Patent [19]

Doi et al.

[11] Patent Number: 5,077,368

[45] Date of Patent: Dec. 31, 1991

[54] OCTADIENE POLYMER AND PROCESS FOR PRODUCING THE SAME

[75] Inventors: Yoshiharu Doi, Kanagawa; Satoshi Ueki; Hiroyuki Furuhashi, both of Saitama, all of Japan

[73] Assignee: Tonen Corporation, Tokyo, Japan

[21] Appl. No.: 493,176

[22] Filed: Mar. 14, 1990

[30] Foreign Application Priority Data

Mar. 28, 1989 [JP] Japan ................................. 1-73985

[51] Int. Cl.$^5$ ..................... C08F 36/20; C08F 4/622
[52] U.S. Cl. .......................... 526/336; 526/169.2; 526/335
[58] Field of Search ................ 526/336, 169.2, 335

[56] References Cited

U.S. PATENT DOCUMENTS

| | | | |
|---|---|---|---|
| 3,472,830 | 10/1969 | Baxter et al. | 526/336 X |
| 3,880,819 | 4/1975 | Natta et al. | 526/169.2 |
| 4,551,503 | 11/1985 | Lal et al. | 526/336 X |

FOREIGN PATENT DOCUMENTS 0311299  4/1989  European Pat. Off. ............ 526/336

OTHER PUBLICATIONS

Journal of American Chemical Society, 81, 4737 (1959).

*Primary Examiner*—Fred Teskin
*Attorney, Agent, or Firm*—Myron B. Kurtzman

[57] ABSTRACT

Polymers of 1,7-octadiene wherein polymerization occurs simultaneously by 1,8- and 1,2-addition.

2 Claims, 2 Drawing Sheets

OCTADIENE POLYMER AND PROCESS FOR PRODUCING THE SAME

BACKGROUND OF THE INVENTION

1. Field of Industrial Application

The present invention relates to new polymers of 1,7-octadiene and a process for producing the same.

2. Prior Art

It is known that 1,7-octadiene can be polymerized by the aid of a catalyst composed of titanium tetrachloride and triisobutyl aluminum. (See Journal of American Chemical Society, vol. 81, p. 4737, [1959].) The thus obtained polymer is said to be composed of 1,2-addition products and cyclized products.

PROBLEMS TO BE SOLVED BY THE INVENTION

Up to now, polymers of 1,7-octadiene manifesting 1,8-addition simultaneously with 1,2-addition have not been disclosed. It is an object of the present invention to provide a new polymer of 1,7-octadiene which has both 1,2-addition and 1,8-addition.

MEANS TO SOLVE THE PROBLEMS

The present inventors found that the object of the present invention is achieved by polymerizing 1,7-octadiene at a low temperature below $-50°$ C. in the presence of a catalyst composed of a vanadium chelate compound and an organoaluminum compound, said catalyst being known to be effective for the homogeneous polymerization of propylene or ethylene. The present invention was completed on the basis of this finding.

SUMMARY OF THE INVENTION

The gist of the present invention resides in:

(1) An octadiene polymer comprising the following structural units (A) and (B) joined together and having a number-average molecular weight of 2,000–500,000.

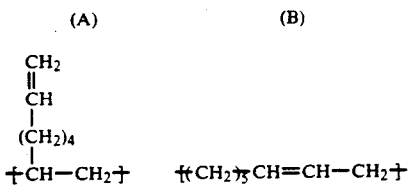

wherein the molar ratio of A/B is 0.1–10, and (2) A process for producing an octadiene polymer specified above, said process comprising polymerizing 1,7-octadiene at $-50°$ C. or below in the presence of a catalyst composed of a vanadium compound represented by the general formula given below and an organoaluminum compound.

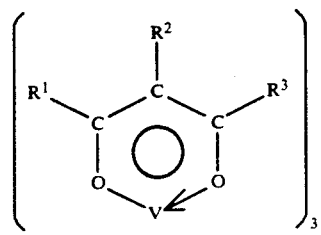

wherein $R^1$, $R^2$, and $R^3$ each denotes a hydrogen atom or a $C_{1-8}$ hydrocarbon group, provided that at least one of $R^1$, $R^2$, and $R^3$ should be a hydrogen atom but all of $R^1$, $R^2$, and $R^3$ should not be hydrogen atoms.

CATALYST (a) Vanadium Compound

The process of the present invention employs a vanadium compound represented by the general formula given below.

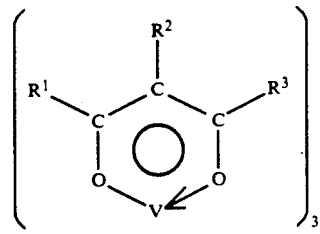

wherien $R^1$, $R^2$, and $R^3$ are defined as above. The vanadium compound represented by the general formula above will be explained with reference to the following examples.

Those in which $R^2$ is a hydrogen atom and $R^1$ and $R^3$ are hydrocarbon groups.

$R^1/R^3$ : $CH_3/Ch_3$, $CH_3/C_2H_5$, $C_2H_5/C_2H_5$, $CH_3/C_6H_5$, $C_2H_5/C_6H_5$, $C_6H_5/C_6H_5$, $CH_3/C_6H_5CH_2$, $C_6H_5CH_2/C_6H_5CH_2$, $C_2H_5/C_6H_5CH_2$, and $C_6H_5/C_6H_5CH_2$.

Those in which $R^2$ is a hydrocarbon group and either of $R^1$ and $R^3$ is a hydrogen atom, with the other being a hydrocarbon group.

$R^2/R^1$ or $R^3$ : $CH_3/Ch_3$, $C_2H_5/CH_3$, $CH_3/C_2H_5$, $C_2H_5/C_2H_5$, $C_6H_5/Ch_3$, $CH_3/C_6H_5$, $C_6H_5/C_2H_5$, $C_2H_5/C_6H_5$, $C_6H_5/C_6H_5$, $C_6H_5CH_2/Ch_3$, $Ch_3/C_6H_5CH_2$, $C_6H_5CH_2/C_6H_5CH_2$, $C_6H_5CH_2/C_2H_5$, $C_2H_5/C_6H_5CH_2$, $C_6H_5CH_2/C_6H_5$, and $C_6H_5/C_6H_5CH_2$.

Those in which $R^2$ is a hydrogen atom and either of $R^1$ and $R^3$ is a hydrogen atom, with the other being a hydrocarbon group.

$R^1$ or $^3$ : $CH_3$, $C_2H_5$, $C_6H_5$, and $C_6H_5CH_2$.

Preferable among the above-listed compounds are the following.

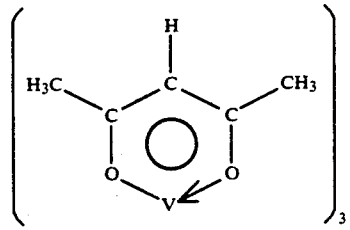

V(acetylacetonato)$_3$

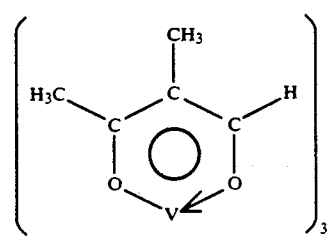

-continued

V(2-methyl-1,3-butanedionato)₃

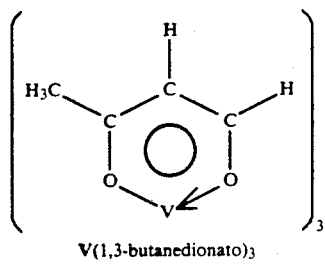

V(1,3-butanedionato)₃

(b) Organoaluminum Compound

The organoaluminum compound is one which is represented by the general formula $R_nAlX_{3-n}$ (where R denotes an alkyl group or aryl group; X denotes a halogen atom or hydrogen atom; and n is an arbitrary number defined by $1 \leq n < 3$.) It is a compound, mixture, or complex compound of $C_{1-18}$ (preferably $C_{2-6}$) alkyl aluminum, such as dialkyl aluminum monohalide, monoalkyl aluminum dihalide, and alkyl aluminum sesquihalide. Dialkyl aluminum monohalide includes dimethyl aluminum chloride, diethyl aluminum chloride, diethyl aluminum bromide, diethyl aluminum iodide, diisobutyl aluminum chloride; monoalkyl aluminum dihalide includes methyl aluminum dichloride, ethyl aluminum dichloride, methyl aluminum.. dibromide, ethyl aluminum dibromide, ethyl aluminum diiodide and isobuty aluminum dichloride; and alkyl aluminum sesquihalide includes ethyl aluminum sesquichloride.

The organoaluminum compound should be used in an amount of 1 to 1,000 mol for 1 mol of the vanadium compound.

POLYMERIZATION OF 1,7-OCTADIENE

The polymerization of 1,7-octadiene should preferably be carried out in a solvent which remains inert and liquid during the polymerization. Examples of such a solvent include propane, butane, pentane, hexane, heptane, and toluene. The polymerization temperature should be $-50°$ C. or below. Especially, polymerization at $-65°$ C. or below gives rise to a nearly monodisperse polymer having a molecular weight distribution of 1.05 to 1.4 (the ratio of $\overline{M}w$ (weight-average molecular weight) to $\overline{M}n$ (number-average molecular weight). The yield and molecular weight of the polymer will be proportional to the length of polymerization time.

According to the process of the present invention as mentioned above, there is obtained a polymer which consists of the following structural units (A) and (B) randomly joined together and has a number-average molecular weight of 2,000–500,000 (in terms of propylene), with the molar ratio of A/B being 0.1–10.

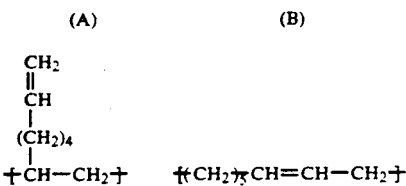

EFFECT OF THE INVENTION

The present invention makes it possible to produce a new polymer having the 1,2-addition and 1,8-addition at a 100% selectivity.

The polymer of the present invention has carbon-carbon double bonds in the side chains and main chains, and hence it may be added to a certain compound for its modification. Because of this property, it will find use as a raw material of adhesives, paints, blending compatibilizers, surfactants, and viscosity index improvers for lubricating oil.

EXAMPLE 1

In a 300-ml flask, with the atmosphere therein thoroughly replaced with nitrogen, was placed 30 ml of toluene followed by cooling to $-78°$ C. To the flask was added 50 mmol of 1,7-octadiene at the same temperature. To the flask were further added a toluene solution containing 20 mmol of $Al(C_2H_5)_2Cl$ and a toluene solution containing 1 mmol of $V(acetylacetonato)_3$. Polymerization was initiated with stirring. After polymerization for 4 hours at $-78°$ C., the reaction mixture was brought into contact with 300 ml of HCl-ethanol mixture. The resulting polymer was washed five times with 300 ml of ethanol, followed by drying under reduced pressure at normal temperature.

Figure 1:
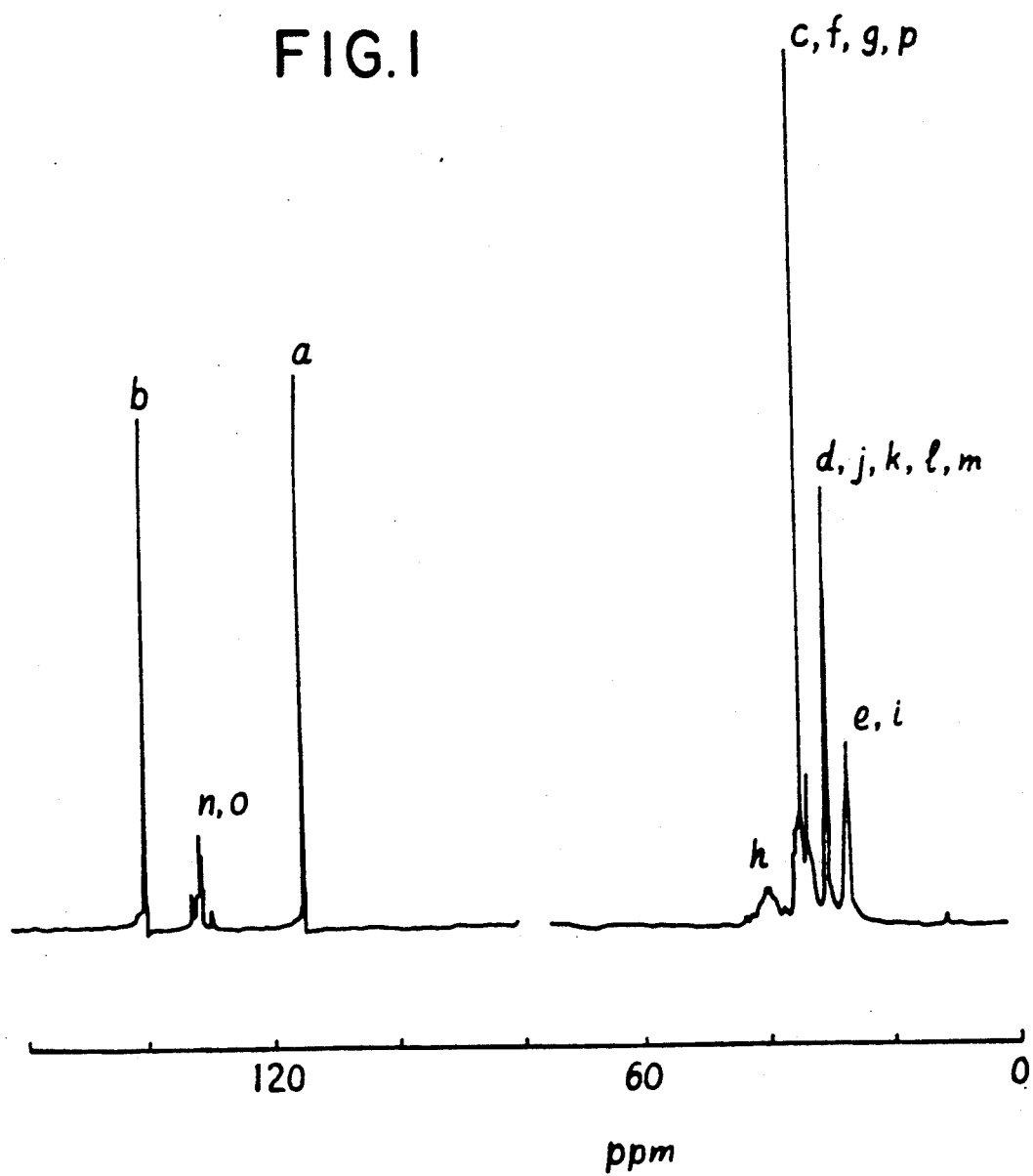
FIGS. 1 and 2 are NMR charts of the polymer obtained according to the present invention.

The resulting polymer was tested for molecular weight by GPC. It was found that $\overline{M}n = 4,000$ (in terms of propylene) and $\overline{M}w/\overline{M}n = 1.4$. In addition, this polymemer gave a $^{13}$C-NMR spectrum as shown in FIG. 1. The assignment is as follows:

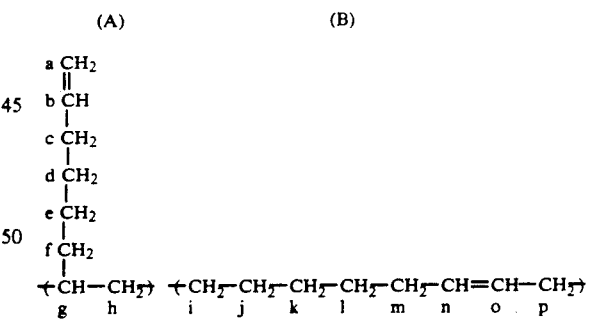

Figure 2:
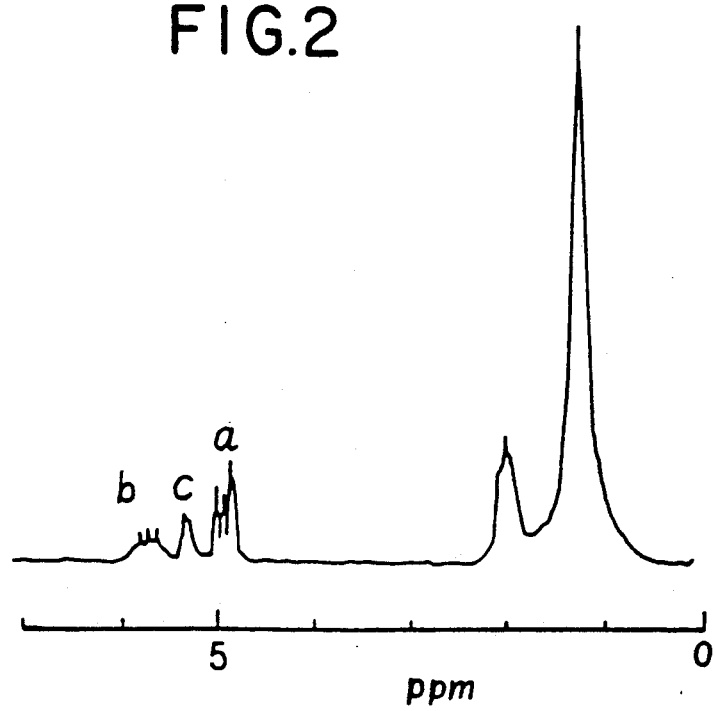

Moreover, this polymer gave a $^1$H-NMR spectrum as shown in FIG. 2. By comparing the intensity of the peak due to the proton of the terminal double bond with that of the peak due to the proton of the internal double bond, it was found that the polymer is composed of units (A) and units (B) in a ratio of 3:1.

From the foregoing, it can be concluded that the polymer in this example is a random copolymer consisting of 75 mol % of structural unit (A) (1,2-addition polyoctadiene) having a double bond in the side chain and 25 mol % of structural unit (B) (1,8-addition polyoctadiene) having double bonds in the main chain, as shown below.

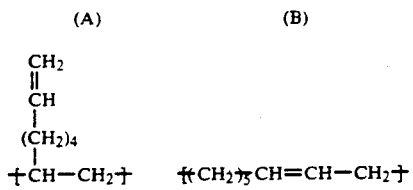

EXAMPLE 2

The polymerization of 1,7-octadiene was carried out in the same manner as in Example 1, except that the polymerization time was changed to 4 hours. The results are shown in Table 1.

EXAMPLE 3

In a 300-ml flask, with the atmosphere therein thoroughly replaced with nitrogen, was placed 130 ml of toluene, followed by cooling to $-50°$ C. To the flask was added 125 mmol of 1,7-octadiene at the same temperature. To the flask were further added a toluene solution containing 10 mmol of $Al(C_2H_5)_2Cl$ and a toluene solution containing 1 mmol of V(2-methyl-1,3-butanedionato)$_3$. Polymerization was initiated with stirring. After polymerization for 4 hours at $-50°$ C., the desired polymer was obtained in the same manner as in Example 1. The results are shown in Table 1.

EXAMPLE 4

The polymerization of 1,7-octadiene was carried out in the same manner as in Example 1, except that the V(acetylacetonato)$_3$ was replaced by V(1,3-butanedionato)$_3$, the amount of toluene was changed to 120 ml. the polymerization temperature was changed to $-70°$ C., and the polymerization time was changed to 6 hours. The results are shown in Table 1.

TABLE 1

| Example No. | Yields (g/g-V atom) | $\overline{Mn}$ ($\times 10^3$) | $\overline{Mw}/\overline{Mn}$ | Molar ratio of unit (A) to unit (B) |
|---|---|---|---|---|
| 1 | 10.4 | 4.0 | 1.4 | 3 |
| 2 | 5.3 | 2.1 | 1.4 | 3 |
| 3 | 39.3 | 7.4 | 1.3 | 4.6 |
| 4 | 12.4 | 4.8 | 1.4 | 2 |

We claim:

1. An octadiene polymer comprising structural units (A) and (B) joined together and having a number-average molecular weight of 2,000–500,000:

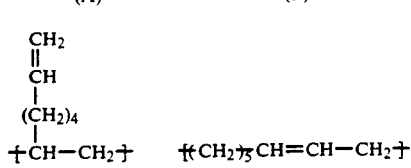

wherein the molar ratio of (A)/(B) is 0.1–10.

2. A process for producing an octadiene polymer comprising structural units (A) and (B) joined together and having a number-average molecular weight of 2,000–500,000,

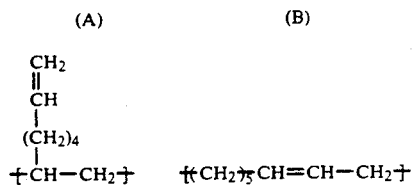

wherein the molar ratio of (A)/(B) is 0.1–10.

said process comprising polymerizing 1,7-octadiene at $-50°$ C. or below in the presence of a catalyst composed of a vanadium compound represented by the general formula,

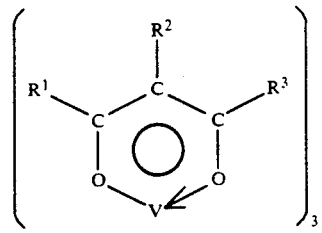

wherein $R^1$, $R^2$, and $R^3$ each denotes a hydrogen atom or a $C_{1-8}$ hydrocarbon group, provided that at least one of $R^1$, $R^2$, and $R^3$ is a hydrogen atom but all of $R^1$, $R^2$, and $R^3$ are not hydrogen atoms and an organoaluminum compound, said organoaluminum compound being represented by the general formula $R_nAlX_{3-n}$, where R denotes an alkyl or aryl group; X denotes a halogen atom or hydrogen atom, and n is an arbitrary number defined by $1 \leq n < 3$.

* * * * *